United States Patent
Zhang et al.

(10) Patent No.: US 12,124,139 B2
(45) Date of Patent: Oct. 22, 2024

(54) DISPLAY SUBSTRATE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Shouqiang Zhang, Beijing (CN); Zhifu Dong, Beijing (CN); Weijie Wang, Beijing (CN)

(73) Assignees: CHONGQING BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,731

(22) PCT Filed: Feb. 28, 2022

(86) PCT No.: PCT/CN2022/078271
§ 371 (c)(1),
(2) Date: Jan. 30, 2023

(87) PCT Pub. No.: WO2023/159561
PCT Pub. Date: Aug. 31, 2023

(65) Prior Publication Data
US 2024/0126125 A1    Apr. 18, 2024

(51) Int. Cl.
*G02F 1/1362* (2006.01)
*G09G 3/36* (2006.01)

(52) U.S. Cl.
CPC ..... *G02F 1/136286* (2013.01); *G09G 3/3607* (2013.01); *G09G 2300/0408* (2013.01);
(Continued)

(58) Field of Classification Search
CPC .. G09F 9/301; G09F 9/35; G09G 3/20; G09G 3/3225; G09G 3/3275; G09G 2300/0408;
(Continued)

(56) References Cited

U.S. PATENT DOCUMENTS

2021/0003896 A1    1/2021  Yoshida et al.
2022/0344616 A1*  10/2022  Du ..................... H10K 50/8426

FOREIGN PATENT DOCUMENTS

CN    105427787 A    3/2016
CN    106292095 A    1/2017
(Continued)

OTHER PUBLICATIONS

English Translation of CN108873521A (Year: 2018).*

*Primary Examiner* — Nelson M Rosario
(74) *Attorney, Agent, or Firm* — WHDA, LLP

(57) ABSTRACT

Provided are a display substrate and a display device. The display substrate includes a display region and a border region located at the periphery of the display region. The border region includes a border sealant, and a plurality of normal shift register units and a plurality of dummy shift register units that are arranged in sequence. The display substrate also includes a plurality of gate lines, at least part of the gate lines is located in the display region; at least one of the dummy shift register units is staggered from the normal shift register units in an extending direction of the gate line, and the at least one of the dummy shift register units is staggered from the normal shift register units in a direction away from the border sealant.

15 Claims, 4 Drawing Sheets

(52) U.S. Cl.
CPC ............... *G09G 2300/0426* (2013.01); *G09G 2310/0286* (2013.01)

(58) Field of Classification Search
CPC ... G09G 2300/0426; G09G 2310/0264; G09G 2310/0281; G09G 2310/0286; H01L 27/14812; H10K 59/131; H10K 59/12; G11C 19/28
See application file for complete search history.

(56) References Cited

FOREIGN PATENT DOCUMENTS

| | | | | |
|---|---|---|---|---|
| CN | 108873521 A | * | 11/2018 | ......... G02F 1/13454 |
| CN | 106448587 B | | 9/2019 | |
| CN | 113380310 A | | 9/2021 | |
| CN | 113568228 A | | 10/2021 | |

* cited by examiner

DISPLAY SUBSTRATE AND DISPLAY DEVICE

CROSS-REFERENCE TO RELATED APPLICATION

This application is the U.S. national phase of PCT Application No. PCT/CN2022/078271 filed on Feb. 28, 2022, the entire contents of which are hereby incorporated by reference.

TECHNICAL FIELD

The present disclosure relates to the field of display technologies, and in particular to a display substrate and a display device.

BACKGROUND

With the continuous development of display technology, ultra-narrow border displays have become the direction of users to pursue, and the realization of ultra-narrow border displays has become the research hotspot of designers. At present, the border region of the display screen is mainly provided with dummy pixels, dummy gate driving circuits, fan-out lines, a driving chip, signal traces, etc., which results in that the border region needs a larger layout space.

SUMMARY

An objective of the present disclosure is to provide a display substrate and a display device.

In order to achieve the above objective, the present disclosure provides the following technical solutions:

In a first aspect, the present disclosure provides a display substrate, including: a display region and a border region located at a periphery of the display region; where the border region includes a border sealant, and a plurality of normal shift register units and a plurality of dummy shift register units that are arranged in sequence. The display substrate further includes a plurality of gate lines, and at least part of the gate lines is located in the display region. At least one of the dummy shift register units is staggered from the normal shift register units in an extending direction of one of the gate lines, and the at least one of the dummy shift register units is staggered from the normal shift register units in a direction away from the border sealant.

Optionally, the plurality of dummy shift register units at least includes a first dummy shift register unit and a second dummy shift register unit; in the extending direction of one of the gate lines, a distance that the first dummy shift register unit is staggered from the normal shift register units is greater than a distance that the second dummy shift register unit is staggered from the normal shift register units.

Optionally, in a direction away from the normal shift register units, distances that the plurality of dummy shift register units and the normal shift register units are staggered in the extending direction of one of the gate lines gradually increase.

Optionally, one of the dunny shift register units includes a dummy output transistor, and an orthographic projection of the dummy output transistor onto a base substrate does not overlap with an orthographic projection of the border sealant onto the base substrate.

Optionally, a minimum distance between the orthographic projection of the dummy output transistor onto the base substrate and the orthographic projection of the border sealant onto the base substrate is greater than or equal to 50 microns.

Optionally, the border region further includes a cascaded signal line, the cascaded signal line is connected between two dummy shift register units of the dummy shift register units and used to transmit a signal between the two dummy shift register units, and an orthographic projection of the cascaded signal line onto a base substrate does not overlap with an orthographic projection of the border sealant onto the base substrate.

Optionally, a minimum distance between orthographic projections of at least two adjacent dummy shift register units onto a base substrate is larger than a minimum distance between orthographic projections of two adjacent normal shift register units onto the base substrate.

Optionally, among the plurality of dummy shift register units, a distance between two adjacent dummy shift register units increases, when a distance between one of the two adjacent dummy shift register units and one of the normal shift register units increases.

Optionally, the display region includes a plurality of normal scanning lines, and the normal scanning lines are coupled to corresponding normal shift register units. The border region further includes a plurality of dummy scanning lines, and the dummy scanning lines are coupled to corresponding dummy shift register units. The display substrate further includes a plurality of data lines; an area of an overlap between an orthographic projection of one of the dummy scanning lines onto a base substrate and an orthographic projection of one of the data lines onto the base substrate is greater than an area of an overlap between an orthographic projection of one of the normal scanning lines onto the base substrate and the orthographic projection of the one data line onto the base substrate.

Optionally, a width of one of the dummy scanning lines is between 8 microns and 15 microns, and a width of a portion where the orthographic projection of one of the data lines onto the base substrate overlaps with the orthographic projection of one of the dummy scanning lines onto the base substrate is between 6 microns and 15 microns.

Optionally, one of the dummy shift register units includes a dummy output transistor, and one of the normal shift register units includes a normal output transistor; a size of the dummy output transistor is smaller than a size of the normal output transistor.

Optionally, the size of the dummy output transistor is ½ or ⅓ of the size of the normal output transistor.

Optionally, the dummy output transistor includes a plurality of sub-transistors that is connected in series.

Optionally, the border region further includes a plurality of fan-out lines, each of the fan-out lines includes a first portion and a second portion, an orthographic projection of the first portion onto a base substrate overlaps an orthographic projection of the border sealant onto the base substrate, and an orthographic projection of the second portion onto the base substrate does not overlap the orthographic projection of the border sealant onto the base substrate. A minimum distance between orthographic projections of adjacent first portions onto the base substrate is greater than a minimum distance between orthographic projections of adjacent second portions onto the base substrate.

Optionally, a width of the first portion is between 2.2 microns and 4 microns, and a minimum distance between the orthographic projections of adjacent first portions onto the base substrate is between 1 micron and 1.2 microns.

In a second aspect, the present disclosure provides a display device including the display substrate described above, based on the technical solution of the display substrate described above.

BRIEF DESCRIPTION OF THE DRAWINGS

The accompanying drawings, which are included to provide a further understanding of the present disclosure, constitute a part of the present disclosure. Illustrative embodiments of the present disclosure and the description thereof serve to explain the present disclosure and do not constitute an undue limitation of the disclosure. In the drawings.

DETAILED DESCRIPTION

In order to further explain the display substrate and the display device provided by the embodiments of the present disclosure, a detailed description will be given below with reference to the accompanying drawings.

The present disclosure provides a display substrate. Dummy shift register units are provided in a border region of the display substrate, which is configured to provide reset signals for a part of pixels in a display region, in particular to resetting normal shift registers of the last few stages. A border sealant is further provided in the border region of the display substrate for sealing the display substrate from up to down, for example, for attaching an array substrate onto a color film substrate of a liquid crystal display, and an orthographic projection of the border sealant onto the base substrate of the display substrate and an orthographic projection of the dummy shift register unit onto the base substrate of the display substrate overlap in a relatively large area.

Since the curing of the border sealant has a certain requirement on the transmittance of a region where the border sealant is located, the relatively large overlapping area formed between the orthographic projection of the border sealant onto the base substrate of the display substrate and the orthographic projection of the dummy shift register unit onto the base substrate of the display substrate may cause the transmittance of a region where the border sealant is located to be relatively low, and cause the curing of the border sealant to be incomplete, thereby affecting the border sealing effect of the border sealant.

Figure 1:
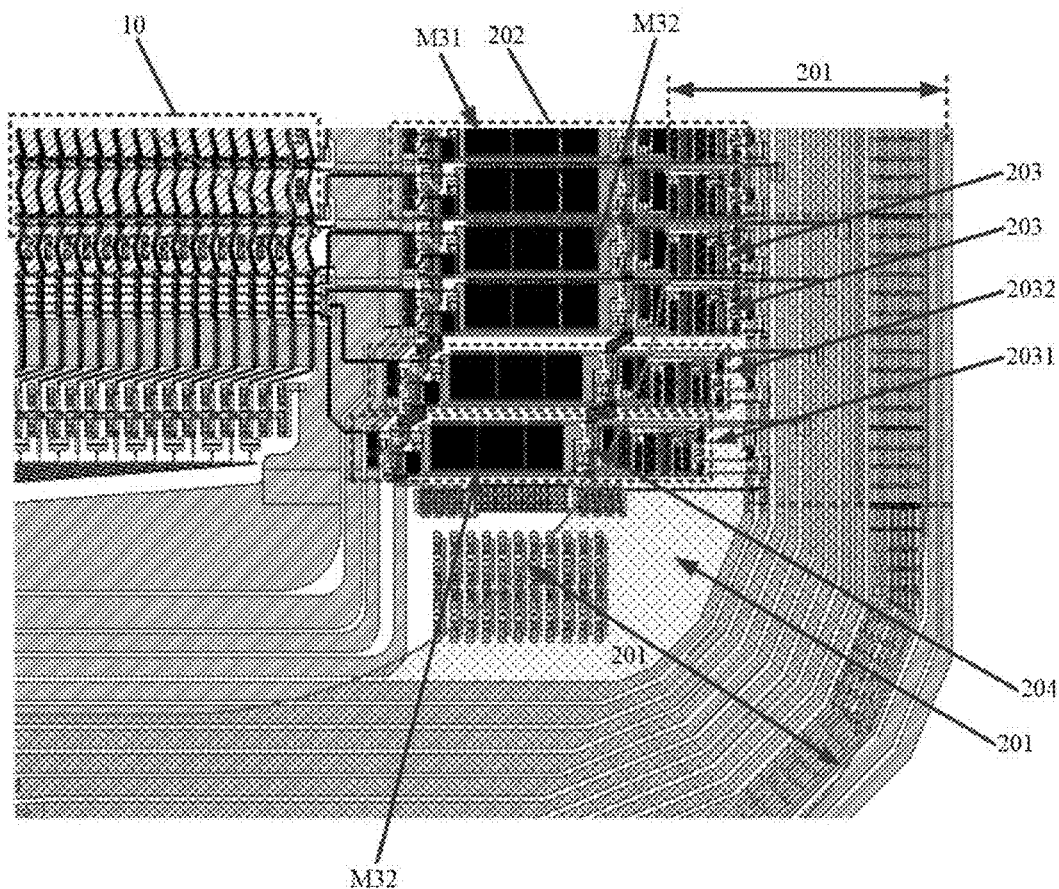
FIG. 1 is a partial schematic structural diagram of a display substrate according to an embodiment of the present disclosure.
Figure 7:
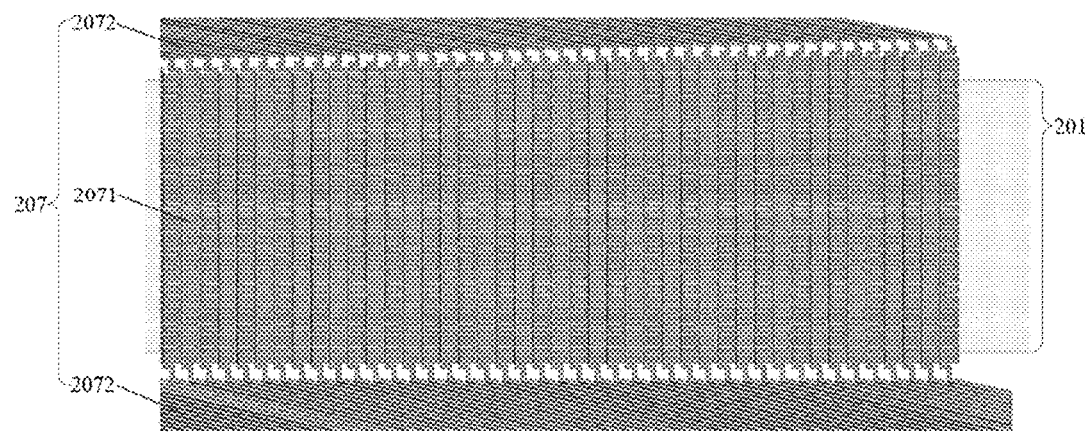
FIG. 7 is a schematic diagram showing the layout of fan-out lines according to an embodiment of the present disclosure.

Referring to FIG. 1 and FIG. 7, an embodiment of the present disclosure provides a display substrate, including: a display region 10 and a border region located at the periphery of the display region 10. The border region includes a border sealant 201, and a plurality of normal shift register units 202 and a plurality of dunny shift register units 203, which are arranged in sequence. The display substrate further includes a plurality of gate lines, at least part of the gate lines is located in the display region 10. At least one of the dummy shift register units 203 is staggered from the normal shift register units 202 in an extending direction of the gate lines, and the at least one of the dummy shift register units 203 is staggered from the normal shift register units 202 in a direction away from the border sealant 201.

Illustratively, the display substrate includes the display region 10 and the border region, the border region surrounds the display region 10, the border region includes a bottom border region, and the bottom border region may be provided with dummy pixels, dummy shift register units 203, fan-out lines 207, a driving chip, traces between the driving chip and a flexible circuit board, a cutting reserved area, etc.

Illustratively, the border sealant 201 is provided in the border region, and the border sealant 201 surrounds the display region 10. The border sealant 201 includes a part located at the bottom border for sealing the border of the display substrate. The border sealant 201 has certain requirements on the transmittance of the region where it is located, so as to ensure the border sealing effect of the border sealant 201 in the curing process.

Illustratively, the border region further includes a plurality of normal shift register units 202 and a plurality of dummy shift register units 203, which are arranged in sequence. The border region may further include a left border and a right border, and at least part of the plurality of normal shift register units 202 and at least part of the plurality of dummy shift register units 203 may be arranged on the left border and/or the right border. Illustratively, the plurality of normal shift register units 202 and the plurality of dummy shift register units 203 may be arranged along an extending direction of long boundaries of the left border and the right border.

Illustratively, the display substrate further includes a plurality of gate lines, and each of the gate lines can extend from the display region 10 to the border region. An extending direction of the gate line intersects the extending direction of the long boundary. Illustratively, the extending direction of the gate line is a lateral direction, and the extending direction of the long boundary is a longitudinal direction.

Illustratively, the at least one of the dummy shift register units 203 being staggered from the normal shift register units 202 in the extending direction of the gate lines includes: in the extending direction of the gate line, at least one of the dummy shift register units 203 is staggered from the last stage of a normal shift register unit 202 that is closest to the at least one dummy shift register unit 203, but is not limited thereto.

Illustratively, in the extending direction of the gate line, an orthographic projection of at least one of the dummy shift register units 203 onto the base substrate of the display substrate is staggered from an orthographic projection of the normal shift register units 202 onto the base substrate of the display substrate.

It is to be noted that the at least one of the dummy shift register units 203 is staggered from the normal shift register units 202 in the extending direction of the gate lines, a certain transistor in the dummy shift register unit 203 and the normal shift register unit 202 may be specifically selected for measurement, and for example, an output transistor in the dummy shift register unit 203 and an output transistor in the normal shift register unit 202 is used for evaluation.

According to the above-mentioned specific structure of the display substrate, it can be seen that in the display substrate provided by the embodiments of the present disclosure, at least one of the dummy shift register units 203 is staggered from the normal shift register units 202 in the extending direction of the gate line, and the at least one of the dummy shift register units 203 is staggered from the normal shift register units 202 in a direction away from the border sealant 201. Such an arrangement enables at least one of the dummy shift register units 203 to be shifted inwards and in a direction away from the border sealant 201, so that most structures in the dummy shift register units 203 can be moved out of the region where the border sealant 201 is located, thereby effectively improving the transmittance of the metal in the region where the border sealant 201 is located, and ensuring the border sealing effect of the border sealant 201.

As shown in FIG. 1, in some embodiments, the plurality of dummy shift register units 203 includes at least a first dummy shift register unit 2031 and a second dummy shift register unit 2032. In the extending direction of the gate line, a distance that the first dummy shift register unit 2031 and the normal shift register unit 202 are staggered is larger than a distance that the second dummy shift register unit 2032 and the normal shift register unit 202 are staggered, where the first dummy shift register unit 2031 is farther from the normal shift register in the extending direction of a data line in the display region, as compared with the second dummy shift register unit 2032.

Illustratively, an orthographic projection of the second dummy shift register unit 2032 onto the base substrate is located between an orthographic projection of the first dummy shift register unit 2031 onto the base substrate and orthographic projections of the normal shift register units 202 onto the base substrate.

Illustratively, in the extending direction of the gate line, a staggering distance that the orthographic projection of the first dummy shift register unit 2031 onto the base substrate and the orthographic projection of the normal shift register units 202 onto the base substrate are staggered is larger than a staggering distance that the orthographic projection of the second dummy shift register unit 2032 onto the base substrate and the orthographic projection of the normal shift register unit 202 onto the base substrate are staggered.

Illustratively, the bottom border includes a corner region, the border sealant 201 includes an arc-shaped portion in the corner region, and the first dummy shift register unit 2031 and the second dummy shift register unit 2032 are closer to the arc-shaped portion than any other dummy shift register units and the normal shift register units.

Illustratively, the first dummy shift register unit 2031 is shifted inwards by 60 microns, and the second dummy shift register unit 2032 is shifted inwards by 51 microns.

In the display substrate provided in the above-mentioned embodiments, in the extending direction of the gate line, the staggering distance that the first dummy shift register unit 2031 and the normal shift register units 202 are staggered is greater than the staggering distance that the second dummy shift register unit 2032 and the normal shift register units 202 are staggered. Such an arrangement enables both the first dummy shift register unit 2031 and the second dummy shift register unit 2032 to shift inwards and in a direction away from the border sealant 201, so that most structures in both the first dummy shift register unit 2031 and the second dummy shift register unit 2032 can be moved out of the region where the border sealant 201 is located, thereby effectively improving the transmittance of metals in the region where the border sealant 201 is located, and ensuring the border sealing effect of the border sealant 201.

Furthermore, the above-mentioned arrangement enables the layout of the dummy shift register units 203 to better match the arc-shaped portion of the border sealant 201, ensuring the transmittance of the metal in the region where the arc-shaped portion is located, and ensuring the border sealing effect of the border sealant 201.

As shown in FIG. 1, in some embodiments, in a direction away from the normal shift register units 202, staggering distances that the plurality of dummy shift register units 203 and one of the normal shift register units 202 are staggered in the extending direction of the gate line gradually increase.

Such an arrangement enables all of the plurality of dummy shift register units 203 to shift inwards in a direction away from the border sealant 201, so that most structures included in each dummy shift register unit 203 can be moved out of the region where the border sealant 201 is located, thereby effectively improving the transmittance of metals in the region where the border sealant 201 is located, and ensuring the border sealing effect of the border sealant 201.

Furthermore, the above-mentioned arrangement enables the layout of the dummy shift register units 203 to better match the arc-shaped portion of the border sealant 201, ensuring the transmittance of the metal in the region where the arc-shaped portion is located, and ensuring the border sealing effect of the border sealant 201.

It is to be noted that in the display substrate provided by the above embodiments, all the dummy shift register units 203 in the display substrate may shift inwards, or only a part of the dummy shift register units 203 may shift inwards. For example, the design shown in FIG. 1 includes six clock signal lines and includes four stages of dummy shift register units, where the last two stages of dummy shift register units are configured to be shifted in the extending direction of the gate lines. That is, the last stage of dummy shift register unit shifts to a side of the display region away from the border sealant as compared with the third stage of dummy shift register unit, the third stage of dummy shift register unit shifts to the side of the display region away from the border sealant as compared with the second stage of dummy shift register units, and the second stage of dummy shift register unit, the first stage of dummy shift register unit and the last stage of dummy shift register unit are sequentially arranged in the extending direction of the data lines without being staggered. Of course, it is also possible to design all the dummy shift register units in a staggered manner, e.g. four stages of the dummy shift register units in the figure are in a staggered design and are not limited thereto.

As shown in FIG. 1, in some embodiments, the dummy shift register unit 203 includes a dummy output transistor M32, and an orthographic projection of the dummy output transistor M32 onto the base substrate does not overlap with an orthographic projection of the border sealant 201 onto the base substrate.

Figure 2:
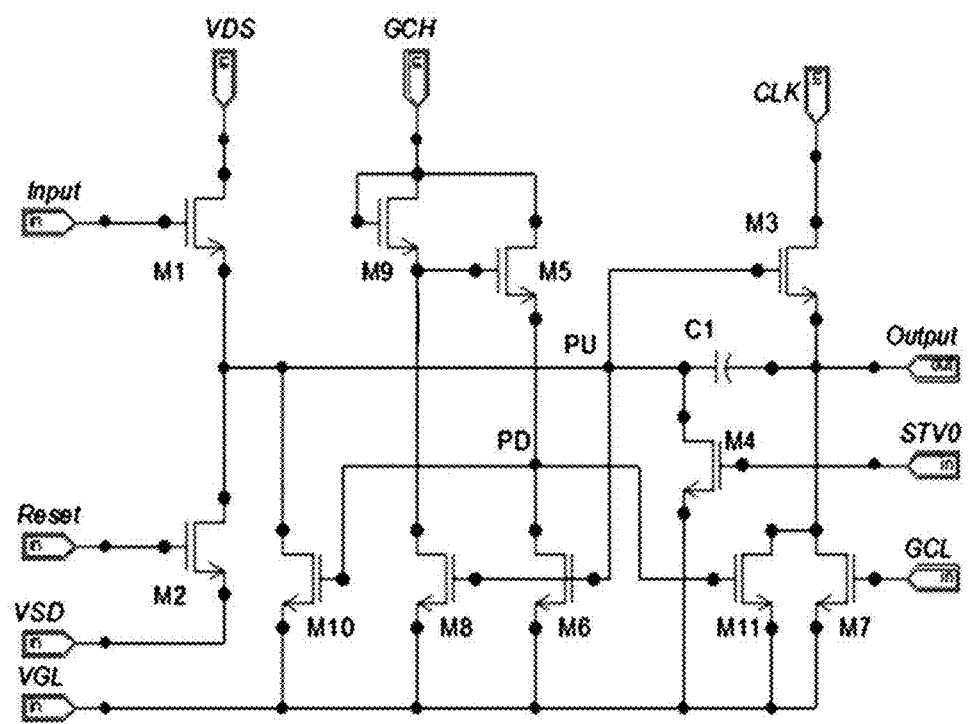
FIG. 2 is a circuit configuration diagram of a normal shift register unit and a dummy shift register unit according to an embodiment of the present disclosure.

As shown in FIG. 2, illustratively, each of the dummy shift register unit 203 and the normal shift register unit 202 may adopt the following structures: specifically, including first to eleventh transistors M1 to M11.

The first transistor M1 forms an input module, a gate electrode of the first transistor M1 is coupled to an input signal line (Input), and a first electrode of the first transistor M1 is coupled to a first signal line VDS, which is configured to transmit a first signal provided by the first signal line VDS to a pull-up node PU under the control of the input signal line (Input).

The second transistor M2 forms a first reset module, a gate electrode of the second transistor M2 is coupled to a first reset line (Reset), a first electrode of the second transistor M2 is coupled to the pull-up node PU, and a second electrode of the second transistor M2 is coupled to a second signal line VSD, which is configured to transmit a second signal provided by the second signal line VSD to the pull-up node PU under the control of the first reset line (Reset) for resetting the pull-up node.

The third transistor M3 (namely, a dummy output transistor M32 or a normal output transistor M31) forms an output module, a gate electrode of the third transistor M3 is coupled to the pull-up node PU, a first electrode of the third transistor M3 is coupled to a clock signal line CLK, and a second electrode of the third transistor M3 is coupled to a driving signal output end (Output), which is configured to control the driving signal output terminal to output a driving signal.

The fourth transistor M4 forms a second reset module, a gate electrode of the fourth transistor M4 is coupled to a frame reset line STV0, a first electrode of the fourth transistor is coupled to the pull-up node PU, and a second electrode of the fourth transistor M4 is coupled to a third signal line VGL, which is configured to reset the pull-up node PU under the control of the frame reset line STV0.

The fifth transistor M5, the sixth transistor M6, the eighth transistor M8 and the ninth transistor M9 together form a pull-down control module, which is coupled to a fourth signal line GCH, the third signal line VGL, the pull-up node PU and a pull-down node PD, and configured to control a potential of the pull-down node PD.

The tenth transistor M10 is used for forming a third reset module, a gate electrode of the tenth transistor M10 is coupled to the pull-down node PD, a first electrode of the tenth transistor M10 is coupled to the pull-up node PU, and a second electrode of the tenth transistor M10 is coupled to the third signal line VGL, which is configured to reset the pull-up node PU under the control of the pull-down node PD.

The eleventh transistor M11 is used for forming a fourth reset module, a gate electrode of the eleventh transistor M11 is coupled to the pull-down node PD, a first electrode of the eleventh transistor M11 is coupled to the driving signal output end (Output), and a second electrode of the eleventh transistor M11 is coupled to the third signal line VGL, which is configured to reset the driving signal output terminal (Output) under the control of the pull-down node PD.

The seventh transistor T7 is used for forming a fifth reset module, a gate electrode of the seventh transistor T7 is coupled to the fifth signal line GCL, a first electrode of the seventh transistor T7 is coupled to the driving signal output end Output. and a second electrode of the seventh transistor T7 is coupled to the third signal line VGL, which is configured to drive the signal output terminal Output under the control of the fifth signal line GCL.

Illustratively, the dunny output transistor M32 is relatively large in size and occupies a relatively large layout space.

Illustratively, the orthographic projection of the dummy output transistor M32 onto the base substrate does not overlap an orthographic projection of the arc-shaped portion of the border sealant 201 onto the base substrate.

In the display substrate provided in the above embodiments, the dummy shift register unit 203 includes the dummy output transistor M32, and the orthographic projection of the dummy output transistor M32 onto the base substrate does not overlap the orthographic projection of the border sealant 201 onto the base substrate. In such an arrangement, the dummy output transistor M32 occupying a larger layout space can be moved out of the region where the border sealant 201 is located, thereby avoiding the influence of the dummy output transistor M32 on the transmittance of the metal in the region where the border sealant 201 is located.

In some embodiments, a minimum distance between the orthographic projection of the dummy output transistor M32 onto the base substrate and the orthographic projection of the border sealant 201 onto the base substrate is greater than or equal to 50 microns.

The above-mentioned arrangement fully considers the accuracy of the production line equipment, and ensures that the orthographic projection of the dummy output transistor M32 onto the base substrate does not overlap with the orthographic projection of the border sealant 201 onto the base substrate, so that most structures included in each dummy shift register unit 203 can be moved out of the region where the border sealant 201 is located, thereby effectively improving the transmittance of the metal in the region where the border sealant 201 is located, and ensuring the border sealing effect of the border sealant 201.

As shown in FIG. 1, in some embodiments, the border region further includes a cascaded signal line 204, the cascaded signal line 204 is connected between two dummy shift register units 203 and is used to transmit a signal between the two dummy shift register units 203, and an orthographic projection of the cascaded signal line 204 onto the base substrate does not overlap with the orthographic projection of the border sealant 201 onto the base substrate.

Illustratively, the display substrate further includes a plurality of buses and a plurality of cascaded signal lines 204, the buses are coupled to the plurality of dummy shift register units 203 and the plurality of normal shift register units 202, and the buses are of various types, such as clock signal line, common signal line, high-level signal line and low-level signal line. The cascaded signal line 204 is connected between two dummy shift register units 203, in which, an input signal may be provided to a lower stage of dummy shift register unit 203 from an upper stage of dummy shift register unit 203, or a reset signal may be provided to an upper stage of dummy shift register unit 203 by a lower stage of dummy shift register unit 203.

It is to be noted that the cascaded signal line 204 may also be provided between two normal shift register units 202, or between the normal shift register unit 202 and the dummy shift register unit 203.

The cascaded signal line 204 is made of a metal material. In the above-mentioned arrangement, the orthographic projection of the cascaded signal line 204 onto the base substrate does not overlap with the orthographic projection of the border sealant 201 onto the base substrate, this prevents the cascaded signal line 204 from affecting the transmittance of metals in the region where the border sealant 201 is located, thereby effectively improving the transmittance of the metal in the region where the border sealant 201 is located and ensuring the border sealing effect of the border sealant 201.

As shown in FIG. 1, in some embodiments, there are at least two dummy shift register units 203, and a minimum distance between orthographic projections of adjacent two of the at least two dummy shift register units 203 onto the base substrate is larger than a minimum distance between orthographic projections of two adjacent normal shift register units 202 onto the base substrate.

Illustratively, the minimum distance between orthographic projections of two adjacent dummy shift register units 203 onto the base substrate includes, but is not limited to, 45.05 microns.

Illustratively, the minimum distance between orthographic projections of two adjacent normal shift register units 202 onto the base substrate includes, but is not limited to, 5.05 microns.

As described above, the minimum distance between orthographic projections of at least two adjacent dummy shift register units 203 onto the base substrate is larger than the minimum distance between orthographic projections of two adjacent normal shift register units 202 onto the base substrate. Such an arrangement ensures that a sufficient trace space is reserved between the adjacent dummy shift register units 203, and a sufficient trace space is reserved between the dummy shift register unit 203 and the normal shift register unit 202 that are adjacent in the process of inwards shifting of the dummy shift register unit 203. Thus, not only the transmittance of the metal in the region where the border sealant 201 is located is effectively improved, the border sealing effect of the border sealant 201 is ensured, but also the short circuit between the trace and the shift register units caused by the insufficient trace space is prevented, thereby effectively improving the stability and reliability of the operation of the display substrate.

In some embodiments, in the plurality of dummy shift register units 203, the larger a distance between a certain dummy shift register unit 203 and the normal shift register unit 202 is, the greater a distance between the certain dummy shift register unit 203 and a dummy shift register unit 203 adjacent to the certain dummy shift register unit 203 is.

In the plurality of dummy shift register units 203, the farther from the normal shift register unit 202, the closer the dummy shift register unit 203 is to the arc-shaped portion of the border sealant 201, the greater the distance that needs to be shifted inwards.

In the display substrate provided in the above embodiments, in the plurality of dummy shift register units 203, the farther from the normal shift register units 202, the greater the distance between two adjacent dummy shift register units 203. With such an arrangement, not only the transmittance of the metal in the region where the border sealant 201 is located can be effectively improved, the border sealing effect of the border sealant 201 can be ensured, but also a sufficient trace space can be well ensured between the adjacent dummy shift register units 203, and the problem of short circuit between the traces and shift register units due to insufficient trace space is avoided, thereby effectively improving the stability and reliability of the operation of the display substrate.

Figure 4:
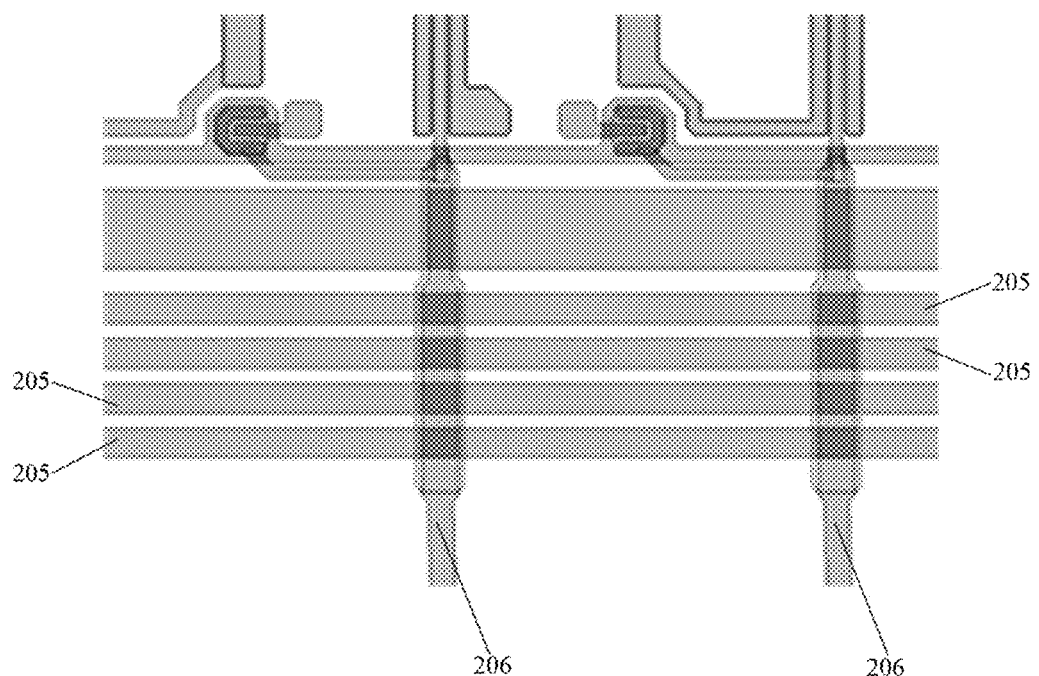
FIG. 4 is a schematic diagram showing the layout of dunny scanning lines and data lines according to an embodiment of the present disclosure.

As shown in FIG. 4, in some embodiments, the display region 10 includes a plurality of normal scanning lines, and the normal scanning lines are coupled to corresponding normal shift register units 202. The border region further includes a plurality of dummy scanning lines 205, and the dunny scanning lines 205 are coupled to corresponding dummy shift register units 203. The display substrate also includes a plurality of data lines 206; an area of an overlap between the orthographic projection of the dummy scanning line 205 onto the base substrate and an orthographic projection of the data line 206 onto the base substrate is greater than an area of an overlap between the orthographic projection of the normal scanning line onto the base substrate and the orthographic projection of the data line 206 onto the base substrate.

Illustratively, the display substrate includes a plurality of sub-pixels, and a plurality of sub-pixel driving circuits included in the plurality of sub-pixels are distributed in an array. The plurality of sub-pixel driving circuits are divided into a plurality of rows of sub-pixel driving circuits and a plurality of columns of sub-pixel driving circuits. The plurality of rows of sub-pixel driving circuits are arranged in a second direction, and each row of sub-pixel driving circuits includes multiple sub-pixel driving circuits arranged in a first direction. The plurality of columns of sub-pixel driving circuits are arranged in the first direction, and each column of sub-pixel driving circuits includes a plurality of sub-pixel driving circuits arranged in the second direction. Illustratively, the first direction intersects the second direction. For example, the first direction includes a lateral direction and the second direction includes a longitudinal direction.

Illustratively, the sub-pixel includes a sub-pixel driving circuit and a light-emitting element. The sub-pixel driving circuit is coupled to an anode of the light-emitting element, and is configured to supply a driving signal to the light-emitting element to drive the light-emitting element to emit light.

Illustratively, the display region 10 includes a plurality of normal scanning lines, and each of the normal scanning lines is coupled to a sub-pixel driving circuit in a corresponding row of sub-pixel driving circuits, for providing a scanning signal to each sub-pixel driving circuit.

Illustratively, the normal scanning line includes a gate line, but is not limited thereto. For example, the normal scanning line may also be a light-emitting control line, a reset line, etc.

Illustratively, the border region further includes a plurality of dummy scanning lines 205, and the dummy scanning lines 205 are respectively coupled to corresponding dummy shift register units 203, the dummy scanning lines 205 serving as loads of the dummy shift register units 203. By controlling the shape, size, and layout configuration of the dummy scanning line 205, the load size of the dummy shift register unit 203 can be adjusted.

Illustratively, the display region 10 further includes a plurality of data lines 206, the plurality of data lines 206 correspond to the plurality of columns of sub-pixel driving circuits in a one-to-one manner, and the data lines 206 are respectively coupled to sub-pixel driving circuits in a corresponding column of sub-pixel driving circuits for providing a data signal to respective sub-pixel driving circuits.

Illustratively, each of the normal scanning line and the dummy scanning line 205 extends in the first direction, and the data line 206 extends in the second direction.

Figure 3:
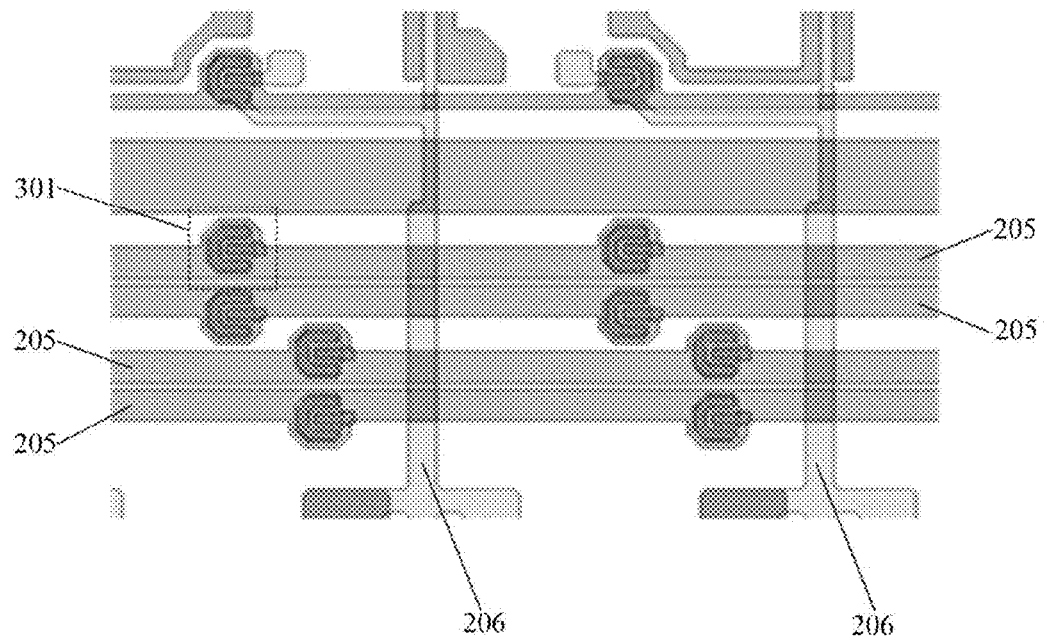
FIG. 3 is a schematic diagram showing the layout of dunny scanning lines and dummy transistors in the related art.

As shown in FIG. 3, illustratively, in a conventional display substrate, dummy pixels may be arranged in the border region, and the dummy pixel includes a dummy transistor 301 coupled to a corresponding dummy scanning line 205, which serves as a load of the dummy shift register unit 203. In the display substrate provided by the above embodiments, the dummy transistor 301 may be removed, leaving only the dummy scanning lines 205.

In the display substrate provided in the above embodiments, the dummy transistor 301 may be removed, and an area of an overlap between the orthographic projection of the dummy scanning line 205 onto the base substrate and an orthographic projection of the data line 206 onto the base substrate is greater than an area of an overlap between the orthographic projection of the normal scanning line onto the base substrate and the orthographic projection of the data line 206 onto the base substrate. In this way, in the case of removing the dummy transistor 301, the layout space of the bottom border can be vacated to a greater extent, and at the same time, the dummy scanning line 205 can be widened, so that the widened part of the dummy scanning line 205 occupies a part of the vacated space, so as to compensate for the load corresponding to the virtual transistor 301, and the remaining vacated space can be directly omitted, so as to better realize the lower narrow border scheme. The display substrate provided by the above embodiments can reduce the width of the bottom border by at least 30 microns and can save about 50% trace space.

In the display substrate provided in the above embodiments, a width of the portion of the data line 206 located in the bottom border region can be widened, and the width of the dummy scanning line 205 can also be widened, so as to realize that the area of the overlap between the orthographic projection of the dummy scanning line 205 onto the base substrate and the orthographic projection of the data line 206 onto the base substrate is greater than the area of overlap between the orthographic projection of the normal scanning line onto the base substrate and the orthographic projection of the data line 206 onto the base substrate, thereby improving a capacitance value of an overlapping capacitor formed between the dummy scanning line 205 and the data line 206.

In the display substrate provided in the above embodiment, it is ensured that the dummy shift register unit 203 and the normal shift register unit 202 have the same or similar load by rationally setting the width of the portion of the data line 206 located in the bottom border region and the width of the dummy scanning line 205.

In some embodiments, the width of each of the dummy scanning lines 205 is between 8 microns and 15 microns, and a width of a portion where the orthographic projection of the data line 206 onto the base substrate overlaps with the orthographic projection of the dummy scanning line 205 onto the base substrate is between 6 microns and 15 microns.

Illustratively, a width of the normal scanning line includes 5 microns, and a width of the portion of the data line 206 located in the display region 10 includes 3.5 microns.

Illustratively, a value of the width of the dummy scanning line 205 includes: 8 microns, 10 microns, 12 microns, 15 microns.

Illustratively, the value of the width of the portion where the orthographic projection of the data line 206 onto the base substrate overlaps the orthographic projection of the dummy scanning line 205 onto the base substrate includes: 8 microns, 10 microns, 12 microns, 14 microns.

In the display substrate provided in the above embodiments, the width of the dummy scanning line 205 and the width of the data line 206 are set in the above-mentioned range, so as to ensure that the dummy shift register unit 203 and the normal shift register unit 202 have the same or similar load.

Figure 5:
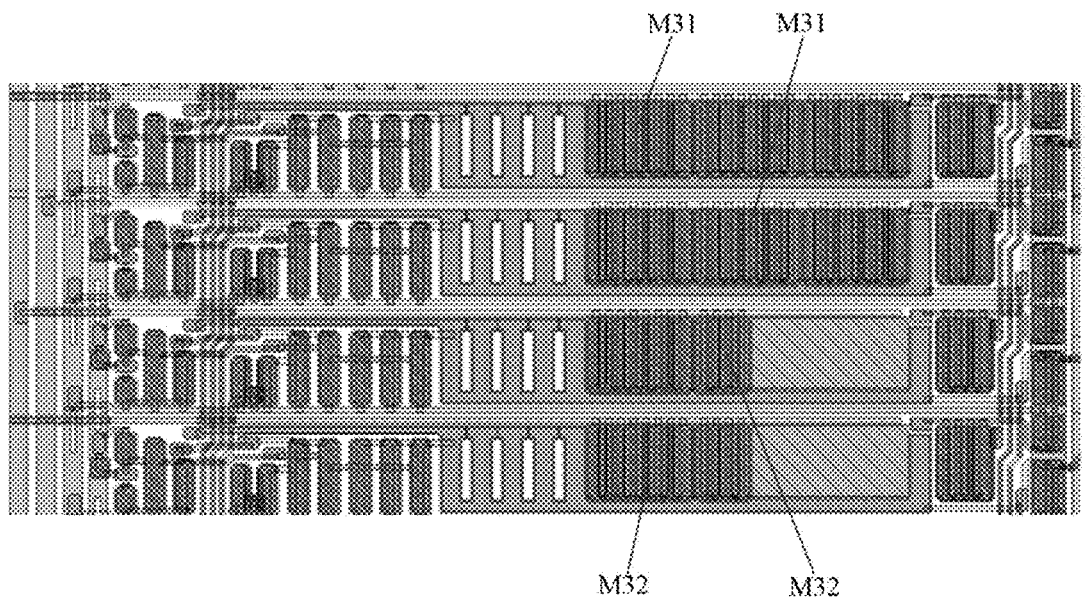
FIG. 5 is a schematic diagram showing a first layout of normal output transistors and dummy output transistors according to an embodiment of the present disclosure.
Figure 6:
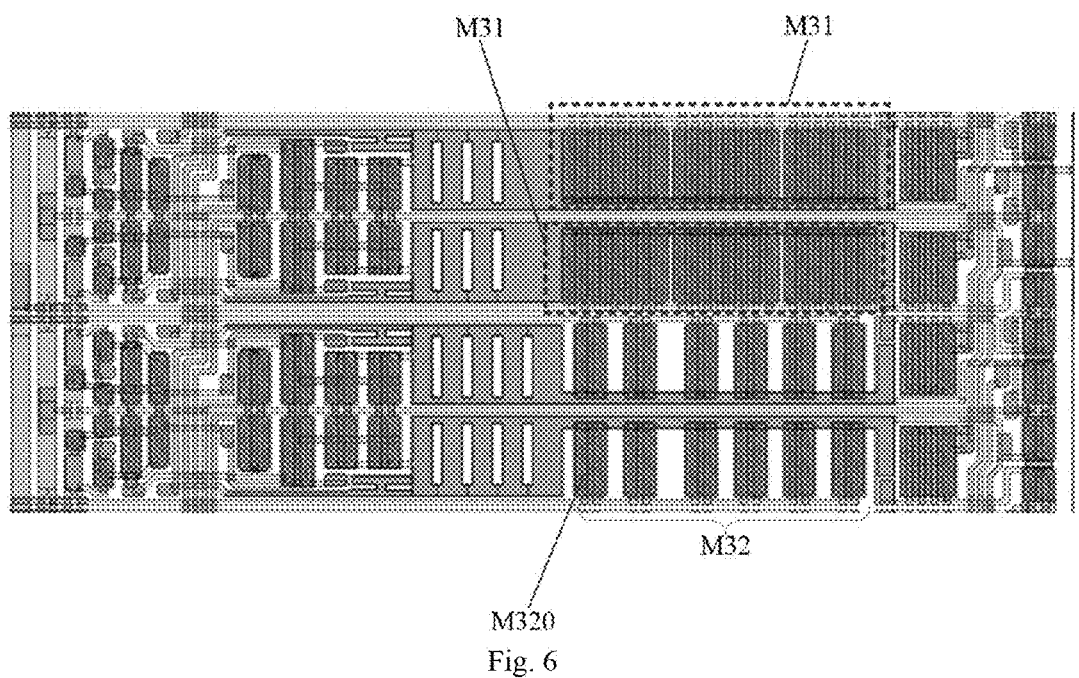
FIG. 6 is a schematic diagram showing a second layout of normal output transistors and dummy output transistors according to an embodiment of the present disclosure.

As shown in FIGS. 5 and 6, in some embodiments, the dummy shift register unit 203 includes a dummy output transistor M32, and the normal shift register unit 202 includes a normal output transistor M31; the size of the dummy output transistor M32 is smaller than the size of the normal output transistor M31.

Illustratively, both the dummy scanning line 205 and the dummy transistor 301 included in the display substrate may be removed. The width of the bottom border is made smaller to the maximum extent.

Illustratively, the above-mentioned arrangement that the size of the dummy output transistor M32 is smaller than the size of the normal output transistor M31 includes: the size of a channel portion of the dummy output transistor M32 is smaller than the size of a channel portion of the normal output transistor M31; or a width-to-length ratio of the dummy output transistor M32 is smaller than a width-to-length ratio of the normal output transistor M31; however, the present invention is not limited thereto.

In the display substrate provided in the above embodiments, by setting that the size of the dummy output transistor M32 to be smaller than the size of the normal output transistor M31, the dummy shift register unit 203 has the same or similar signal delay as the normal shift register unit 202 in the case where the dummy shift register unit 203 is not connected to the dummy scanning line 205 and the dummy transistor 301, which ensures a reset signal to be normally provided for the pixels in the display region 10.

As shown in FIGS. 5 and 6, in some embodiments, the size of the dummy output transistor M32 is set to be ½ or ⅓ of the size of the normal output transistor M31, but is not limited thereto.

The above-mentioned arrangement enables the dummy shift register unit 203 to have the same or similar signal delay as the normal shift register unit 202 in the case that the dummy shift register unit 203 is not connected to the dummy scanning line 205 and the dummy transistor 301, and can ensure that a reset signal is normally provided for the pixel of the display region 10.

As shown in FIGS. 5 and 6, in some embodiments, the dummy output transistor M32 includes a plurality of sub-transistors M320 that are connected in series.

Illustratively, the plurality of sub-transistors M320 are uniformly distributed.

The above-mentioned arrangement enables the dummy shift register unit 203 to have the same or similar signal delay as the normal shift register unit 202 in the case where the dummy shift register unit 203 is not connected to the dummy scanning line 205 and the dummy transistor 301, and can ensure that a reset signal is normally provided for the pixel of the display region 10.

Figure 8:
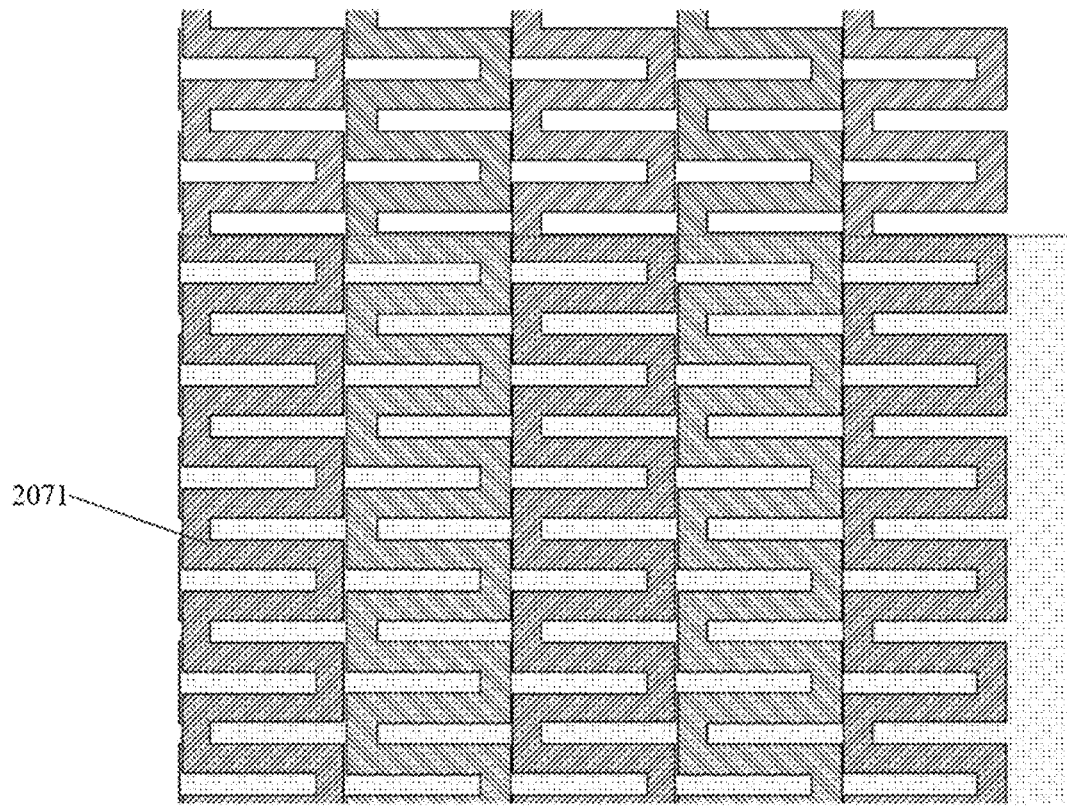
FIG. 8 is an enlarged schematic diagram of a first portion of a fan-out line according to an embodiment of the present disclosure.

As shown in FIG. 7 and FIG. 8, in some embodiments, the border region further includes a plurality of fan-out lines 207, the fan-out line 207 includes a first portion 2071 and a second portion 2072, an orthographic projection of the first portion 2071 onto the base substrate overlaps the orthographic projection of the border sealant 201 onto the base substrate, and an orthographic projection of the second portion 2072 onto the base substrate does not overlap the orthographic projection of the border sealant 201 onto the base substrate. A minimum distance between orthographic projections of adjacent first portions 2071 onto the base substrate is greater than a minimum distance between orthographic projections of adjacent second portions 2072 onto the base substrate.

Illustratively, the plurality of fan-out lines 207 includes a plurality of first fan-out lines 207 and a plurality of second fan-out lines 207, the first fan-out line 207 and the second fan-out line 207 are alternatively arranged. The first fan-out line 207 and the second fan-out line 207 each includes the first portion 2071 and the second portion 2072.

Illustratively, the first fan-out line 207 is made of a first gate metal layer of the display substrate, and the second fan-out line 207 is made of a source/drain metal layer of the display substrate. The source/drain metal layer may be selected from a first source/drain metal layer or a second source/drain metal layer.

Illustratively, each fan-out line 207 includes a first portion 2071 and two second portions 2072, the first portion 2071 is located between two second portions 2072, and the first portion 2071 is coupled to the two second portions 2072. A first portion 2071 near the display region 10 is coupled to a data line 206 in the display region 10, and the other first portion 2071 far from the display region 10 may be coupled to the driving chip for accessing a data signal.

Illustratively, the first portion 2071 includes a fold line structure including a plurality of fold line corners. The second portion 2072 includes a diagonal structure that extends in a direction that intersects both the first direction and the second direction.

In the display substrate provided in the above embodiments, the fan-out lines 207 are designed to include multiple sections, and a minimum distance between orthographic projections of adjacent two of the first portions 2071 onto the base substrate is set to be greater than a minimum distance between orthographic projections of adjacent two of the second portions 2072 onto the base substrate, so that there is a greater distance between the first portions 2071 in the region where the border sealant 201 is located, which is beneficial to improve the transmittance of the metal in the region where the border sealant 201 is located, and the transmittance can be greater than or equal to 35%. At the same time, a smaller distance is designed between adjacent two of the second portions 2072 which are not located in the region where the border sealant 201 is located, so that a smaller bottom border space can be occupied.

In display substrate provided by the above embodiments, a transmittance of 42.85% can be achieved.

In some embodiments, the width of the first portion 2071 is between 2.2 microns and 4 microns, and a minimum distance between the orthographic projections of two adjacent first portions 2071 onto the base substrate is between 1 micron and 1.2 microns.

Illustratively, the width of the first portion 2071 includes 3.5 microns, and the minimum distance between orthographic projections of adjacent first portions 2071 onto the base substrate includes 1.5 microns.

Illustratively, the width of the second portion 2072 includes 3.5 microns, and the minimum distance between orthographic projections of adjacent second portions 2072 onto the base substrate includes 1.0 microns. The region where the second portion 2072 is located can have a transmittance of up to 28.5%.

An embodiment of the present disclosure further provides a display device including the display substrate described above.

In the display substrate provided in the above embodiments, at least one of the dummy shift register units 203 is staggered from the normal shift register units 202 in the extending direction of the gate line, and the at least one of the dummy shift register units 203 is staggered from the normal shift register units 202 in a direction away from the border sealant 201. Such an arrangement enables at least one of the dummy shift register units 203 to be shifted inwards and in a direction away from the border sealant 201, so that most structures in the dummy shift register units 203 can be moved out of the region where the border sealant 201 is located, thereby effectively improving the metal transmittance of the region where the border sealant 201 is located, and ensuring the border sealing effect of the border sealant 201. Therefore, the display device provided by the embodiments of the present disclosure also has the above-described advantageous effects when including the above-described display substrate.

It is to be noted that the display device may be: any product or component with a display function, such as a television, a display, a digital photo border, a mobile phone, a tablet computer, and the display device further includes a flexible circuit board, a printed circuit board and a back plate.

Illustratively, the display device includes a liquid crystal display device. The liquid crystal display device may be manufactured using a 6Mask process or an 8Mask process.

The 6Mask process flow includes: sequentially fabricating a first gate metal layer, an active layer, a first indium tin oxide layer (forming a pixel electrode), a source/drain metal layer, a passivation layer and a second indium tin oxide layer (forming a common electrode).

The 8Mask process flow includes: sequentially fabricating a first gate metal layer, a gate insulating layer, an indium gallium zinc oxide layer (IGZO), a source/drain metal layer, an insulating layer, a first indium tin oxide layer (forming a common electrode), a passivation layer, and a second indium tin oxide layer (forming a pixel electrode).

It is to be noted that the signal line extending in the X direction means that: the signal line includes a main part and a secondary part connected to the main part, the main part is a line, a line segment or a bar-shaped body, the main part extends in the X-direction, and the length of the main part extends in the X-direction is greater than the length of the secondary part extending in another direction.

It is to be noted that the "same layer" in the embodiments of the present disclosure may refer to film layers being on the same structural layer. Or, for example, the film layer in the same layer may be a layer structure formed by forming a film layer for forming a specific pattern using a single film forming process and then patterning the film layer by one patterning process using the same mask plate. Depending on the particular pattern, the single patterning process may include multiple exposure, development, or etching processes, and the particular pattern in the resulting layer structure may or may not be continuous. The particular patterns may also be at different heights or have different thicknesses.

In various method embodiments of the present disclosure, the serial number of each step cannot be used to define the order of each step, and a person of ordinary skill in the art can change the order of each step without involving inventive effort, which shall also fall within the protection scope of the present disclosure.

It should be noted that the various embodiments described herein are described in a progressive manner, the same or similar parts of the various embodiments can refer to each other, and each embodiment focuses on differences from the other embodiments. In particular, the method embodiments are described more simply because they are substantially similar to the product embodiments, and for the interrelated part, the partial description of the product embodiments may be referred to.

Unless defined otherwise, technical or scientific terms used in this disclosure shall have the ordinary meaning as understood by one of ordinary skill in the art to which this disclosure belongs. Such terms as "first", "second" used herein do not denote any order, quantity, or importance, but rather are used to distinguish one element from another. Such terms as "comprise" or "include" mean that the presence of an element or item preceding the word covers the presence of the element or item listed after the word and equivalents thereof, but does not exclude other elements or items. Such terms as "connecting" or "connected" are not limited to physical or mechanical connections, but may include electrical connections, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the above embodiments, particular features, structures, materials, or characteristics may be combined in any suitable manner in any one or more embodiments or examples.

The above implementations are just specific embodiments of the present disclosure, but the protection scope of the present disclosure is not limited thereto. A person of ordinary skill in the art can think of changes or equivalents within the technical scope of the present disclosure, which shall fall within the protection scope of the present disclosure. Therefore, the protection scope of the present disclosure shall be subjected to the claims.

What is claimed is:

1. A display substrate, comprising: a display region and a border region located at a periphery of the display region; wherein the border region comprises a border sealant, and a plurality of normal shift register units and a plurality of dummy shift register units that are arranged in sequence;
the display substrate further comprises a plurality of gate lines, and at least part of the gate lines is located in the display region;
at least one of the dummy shift register units is staggered from the normal shift register units in an extending direction of one of the gate lines, and the at least one of the dummy shift register units is staggered from the normal shift register units in a direction away from the border sealant;
wherein the display region comprises a plurality of normal scanning lines, and the normal scanning lines are coupled to corresponding normal shift register units;
the border region further comprises a plurality of dummy scanning lines, and the dummy scanning lines are coupled to corresponding dummy shift register units;
the display substrate further comprises a plurality of data lines; an area of an overlap between an orthographic projection of one of the dummy scanning lines onto a base substrate and an orthographic projection of one of the data lines onto the base substrate is greater than an area of an overlap between an orthographic projection of one of the normal scanning lines onto the base substrate and the orthographic projection of the one data line onto the base substrate.

2. The display substrate according to claim 1, wherein the plurality of dummy shift register units at least comprises a first dummy shift register unit and a second dummy shift register unit; in the extending direction of one of the gate lines, a distance that the first dummy shift register unit is staggered from the normal shift register units is greater than a distance that the second dummy shift register unit is staggered from the normal shift register units.

3. The display substrate according to claim 1, wherein in a direction away from the normal shift register units, distances that the plurality of dummy shift register units and the normal shift register units are staggered in the extending direction of one of the gate lines gradually increase.

4. The display substrate according to claim 1, wherein one of the dummy shift register units comprises a dummy output transistor, and an orthographic projection of the dummy output transistor onto a base substrate does not overlap with an orthographic projection of the border sealant onto the base substrate.

5. The display substrate according to claim 4, wherein a minimum distance between the orthographic projection of the dummy output transistor onto the base substrate and the orthographic projection of the border sealant onto the base substrate is greater than or equal to 50 microns.

6. The display substrate according to claim 1, wherein the border region further comprises a cascaded signal line, the cascaded signal line is connected between two dummy shift register units of the dummy shift register units and used to transmit a signal between the two dummy shift register units, and an orthographic projection of the cascaded signal line onto a base substrate does not overlap with an orthographic projection of the border sealant onto the base substrate.

7. The display substrate according to claim 1, wherein a minimum distance between orthographic projections of at least two adjacent dummy shift register units onto a base substrate is larger than a minimum distance between orthographic projections of two adjacent normal shift register units onto the base substrate.

8. The display substrate according to claim 7, wherein among the plurality of dummy shift register units, a distance between two adjacent dummy shift register units increases, when a distance between one of the two adjacent dummy shift register units and one of the normal shift register units increases.

9. The display substrate according to claim 1, wherein a width of one of the dummy scanning lines is between 8 microns and 15 microns, and a width of a portion where the orthographic projection of one of the data lines onto the base substrate overlaps with the orthographic projection of one of the dummy scanning lines onto the base substrate is between 6 microns and 15 microns.

10. The display substrate according to claim 1, wherein one of the dummy shift register units comprises a dummy output transistor, and one of the normal shift register units comprises a normal output transistor; a size of the dummy output transistor is smaller than a size of the normal output transistor.

11. The display substrate according to claim 10, wherein the size of the dummy output transistor is ½ or ⅓ of the size of the normal output transistor.

12. The display substrate according to claim 10, wherein the dummy output transistor comprises a plurality of sub-transistors that is connected in series.

13. The display substrate according to claim 1, wherein the border region further comprises a plurality of fan-out lines, each of the fan-out lines comprises a first portion and a second portion, an orthographic projection of the first portion onto a base substrate overlaps an orthographic projection of the border sealant onto the base substrate, and an orthographic projection of the second portion onto the base substrate does not overlap the orthographic projection of the border sealant onto the base substrate;
a minimum distance between orthographic projections of adjacent first portions onto the base substrate is greater than a minimum distance between orthographic projections of adjacent second portions onto the base substrate.

14. The display substrate according to claim 13, wherein a width of the first portion is between 2.2 microns and 4 microns, and a minimum distance between the orthographic projections of adjacent first portions onto the base substrate is between 1 micron and 1.2 microns.

15. A display device, comprising the display substrate according to claim 1.

* * * * *